(12) United States Patent
Soryal et al.

(10) Patent No.: US 11,822,889 B2
(45) Date of Patent: Nov. 21, 2023

(54) PERSONAL CONVERSATIONALIST SYSTEM

(71) Applicant: AT&T Intellectual Property I, L.P., Atlanta, GA (US)

(72) Inventors: Joseph Soryal, Ridgewood, NY (US); Naila Jaoude, Eatontown, NJ (US); Samuel N. Zellner, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 392 days.

(21) Appl. No.: 16/825,023

(22) Filed: Mar. 20, 2020

(65) Prior Publication Data

US 2021/0294977 A1    Sep. 23, 2021

(51) Int. Cl.
*G06F 40/30* (2020.01)
*G06F 9/54* (2006.01)

(52) U.S. Cl.
CPC .............. *G06F 40/30* (2020.01); *G06F 9/542* (2013.01)

(58) Field of Classification Search
CPC ........ G06F 40/30; G06F 9/542; G06F 40/268; G10L 15/183; G10L 15/187; G10L 15/30
See application file for complete search history.

(56) References Cited

U.S. PATENT DOCUMENTS

| | | | | |
|---|---|---|---|---|
| 9,318,108 B2* | 4/2016 | Gruber | ................... | G10L 15/22 |
| 10,332,513 B1* | 6/2019 | D'Souza | ............... | G10L 15/183 |
| 11,038,934 B1* | 6/2021 | Hansen | ................... | H04L 43/08 |
| 2011/0060587 A1* | 3/2011 | Phillips | ................... | G10L 15/30 |
| | | | | 704/235 |
| 2017/0371861 A1* | 12/2017 | Barborak | ................ | G06F 40/35 |
| 2019/0095428 A1* | 3/2019 | Asano | ................... | G10L 15/187 |
| 2020/0294101 A1* | 9/2020 | Bell | ...................... | G06F 40/279 |
| 2020/0395008 A1* | 12/2020 | Cohen | ................... | G06F 40/268 |

* cited by examiner

*Primary Examiner* — Michael Colucci
(74) *Attorney, Agent, or Firm* — GUNTIN & GUST, PLC; Andrew Gust

(57) ABSTRACT

A personal conversationalist system includes a processor, and a computer-readable medium storing instructions which, when executed by the processor, cause the processor to operations that include receiving a first data input feed, accessing a first user profile that is as associated with a first user, detecting a conversation event when first data in the first data input feed satisfies a first conversation event condition, generating a first conversationalist persona based on the conversation event, the first user profile, and data provided in the first data input feed; and initiating a first conversation session via the first conversationalist persona by outputting a first conversationalist persona response that is based on the conversation event, the first user profile, and the data provided in the first data input feed.

20 Claims, 6 Drawing Sheets

PERSONAL CONVERSATIONALIST SYSTEM

FIELD OF THE DISCLOSURE

This disclosure relates generally to computing devices, and, more particularly, to computing devices that interact with users via a virtual personal conversationalist.

BACKGROUND

Recent developments have resulted in computer programs or agents that simulate intelligent conversations with one or more human users. Such interactive speech services are sometimes referred to as "chatbots" or "chatterbots" that are used as virtual assistants that can understand human speech and act based on a specified set of actions. Virtual assistants can use either chat, speech, or video to interact with a user and are configured to operate in a dialog form with the user initiating the conversation.

SUMMARY

An personal conversationalist method and system includes a user device and/or server system that receives a first data input feed, accesses a first user profile that is as associated with a first user, detects a conversation event when first data in the first data input feed satisfies a first conversation event condition, generates a first conversationalist persona based on the conversation event, the first user profile, and data provided in the first data input feed, and initiates a first conversation session via the first conversationalist persona by outputting a first conversationalist persona response that is based on the conversation event, the first user profile, and the data provided in the first data input feed.

In various embodiments of the methods and systems disclosed herein the user device and/or server system receives a second data feed, such that the generating the first conversationalist persona is based on the first conversation event condition, the first user profile, the first data input feed, and the second data feed.

In various embodiments of the methods and systems disclosed herein the user device and/or server system receives a first user response in response to the first conversationalist persona response, determines a second first conversationalist persona response based on the first user response, the first data input feed, and the first user profile, and outputs a second conversationalist persona response based on the first user response.

In various embodiments of the methods and systems disclosed herein the user device and/or server system receives a first user response in response to the first conversationalist persona response, updates, using a machine learning algorithm, the first user profile based on the first user response to generate a first user updated profile.

In various embodiments of the methods and systems disclosed herein the user device and/or server system generates a second conversationalist persona based on the conversation event, the first user updated profile, and the data provided in the first data input feed, and initiates a second conversation session via the second conversationalist persona by outputting a second conversationalist persona response that is based on the conversation event, the first user updated profile, and the data provided in the first data input feed.

In various embodiments of the methods and systems disclosed herein the generation of the first conversationalist persona is performed by a first user device associated with the first user.

In various embodiments of the methods and systems disclosed herein the generation of the first conversationalist persona is performed by a server device that is in communication with a first user device associated with the first user.

In various embodiments of the methods and systems disclosed herein the user device and/or server system receives a first user response in response to the first conversationalist persona response, determines that the first user response indicates that the first conversation session has ended, and ends the first conversation session. The first user response may be a lack of user input during a predetermined time.

In various embodiments of the methods and systems disclosed herein the detection of the conversation event when the first data in the first data input feed satisfies the first conversation event condition stored in the first user profile includes detecting that a location of the first user identified in the first data input feed satisfies a location condition.

In various embodiments of the methods and systems disclosed herein the conversation event when the first data in the first data input feed satisfies the first conversation event condition stored in the first user profile includes detecting that a first application on a first user device has been launched.

In various embodiments of the methods and systems disclosed herein the user device and/or the server system provides a first output of the first data input feed to the first user via a user output system, receives a second data input feed, determines that the second data input feed satisfies an output condition, and provides a second output of the second data input feed to the first user via the user output system. In various embodiments the user device and/or server system outputs a second conversationalist persona response based on data provided in the second data input feed. In various embodiments, the first data input feed is obtained from a first sensor system coupled to a first user device and the user output system is coupled to the first user device, and the second data input feed is obtained from a second sensor system that is coupled to a second user device and is received by the first user device via a communication system.

In various embodiments of the methods and systems disclosed herein the user device and/or the server system receives a second data input feed, such that the first conversationalist persona response is based on the conversation event, the first user profile, and the data provided in the first data input feed.

In various embodiments of the methods and systems disclosed herein the user device and/or the server system determines that processing performed for the generating the first conversationalist persona or generating the first conversationalist persona response satisfies a processing threshold at a first user device, performs a first portion of the processing at the first user device, and off-loads a second portion of the processing to a server device.

In various embodiments of the methods and systems disclosed herein the user device and/or the server system accesses a second user profile that is as associated with a second user, detects the conversation event when the first data in the first data input feed satisfies the first conversation event condition, generates a second conversationalist persona based on the conversation event, the second user profile, and the data provided in the first data input feed, and initiates a second conversation session via the second conversationalist persona by outputting a second conversationalist persona response is based on the conversation event, the second user profile, and the data provided in the first data input feed. In various embodiments, the second conversationalist persona and the second conversationalist persona response provide different content than the first conversationalist persona and the first conversationalist persona response.

Figure 1:
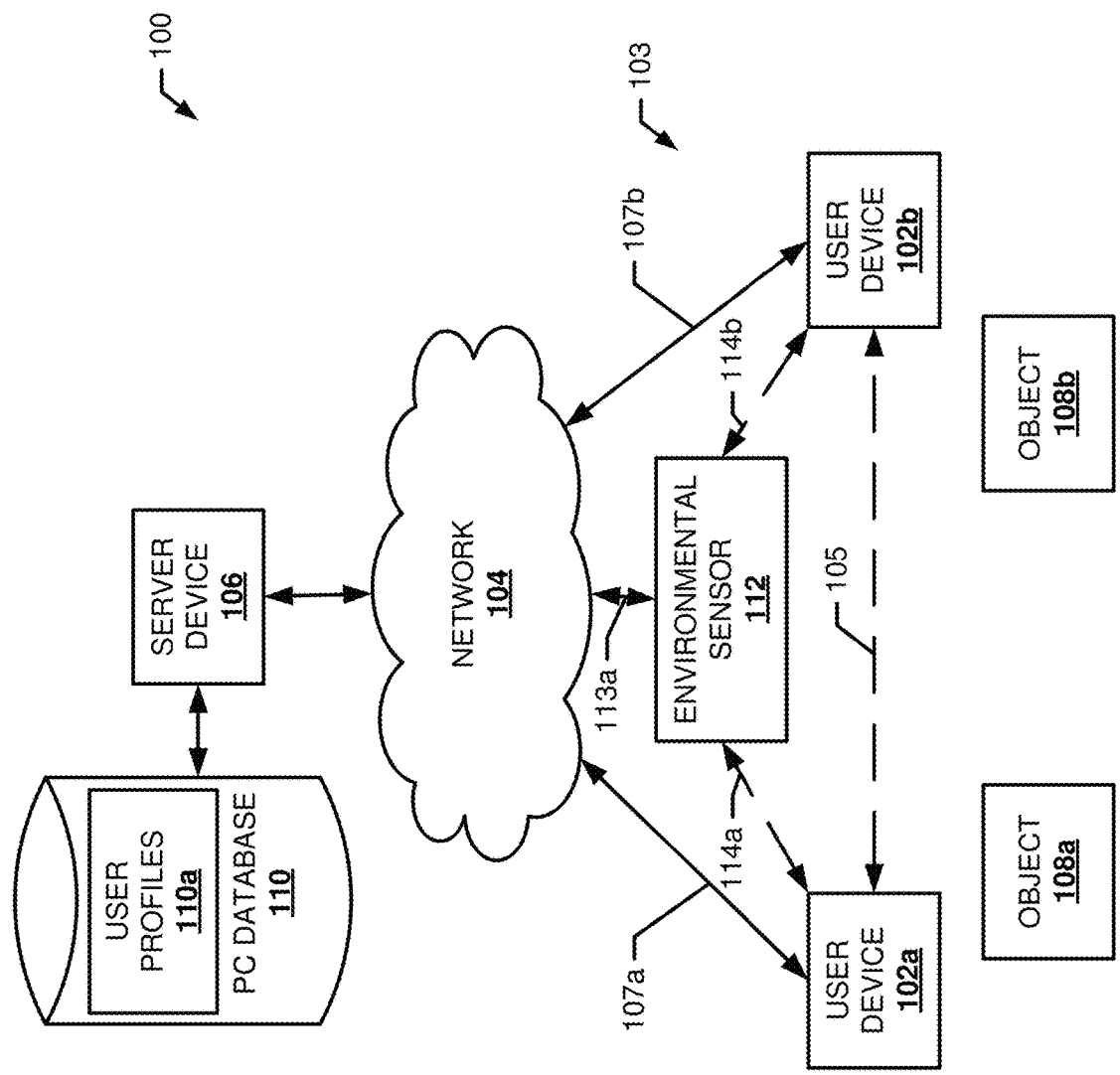
FIG. 1 is a schematic view illustrating an embodiment of a personal conversationalist system.

Embodiments of the present disclosure may be understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure include personal conversationalist systems and methods that may be used, for example, provide a personalized conversationalist persona that may initiate a conversation session with a user. A user device may collaborate with other user devices within a physical environment and/or over a network to receive and/or provide information between each other such that a personal conversationalist controller can determine when to initiate a conversation session with a user that includes outputting one or more conversationalist persona responses and receiving one or more user responses. The conversationalist persona used to perform the personal conversation session may dynamically change based on the conversation session and the user. Processing tasks may be distributed to various devices within the personal conversationalist system and/or repeat processing tasks may be shared between devices within the physical environment to limit the repetitive processing. This improves efficiency by reusing computation resources in the cloud, reduces end-to-end latency, and saves mobile data usage.

Referring now to FIG. 1, an embodiment of a personal conversationalist system 100 is illustrated. In the illustrated embodiment, the personal conversationalist system 100 includes a user device 102a and a user device 102b provided in a physical environment 103. The physical environment 103 may be any indoor and/or outdoor space that may be contiguous or non-contiguous. For example, the physical environment may include a yard, a home, a business, a park, a stadium, a museum, an amusement park, an access space, an underground shaft, or other spaces. The physical environment 103 may be defined by geofencing techniques that may include specific geographic coordinates such as latitude, longitude, and/or altitude, and/or operate within a range defined by a wireless communication signal. The physical environment 103 may include a plurality of objects such as an object 108a and an object 108b. In other embodiments, the physical environment 103 may include a city, a county, a country, and/or some other defined space such that the user device 102a may be separated from the user device 102b such that any short-range communications made directly between the user devices 102a and 102b, as discussed below, cannot be completed without the use or an intermediary device In various embodiments, the user devices 102a and 102b are described as mobile computing devices such as laptop/notebook computing devices, tablet computing devices, mobile phones, a vehicle (e.g., a car, a truck, a personal transportation unit, etc.) and wearable computing devices. However, in other embodiments, the user device 102a and 102b may be provided by desktop computing devices, server computing devices, and/or a variety of other computing devices that would be apparent to one of skill in the art in possession of the present disclosure. The user device 102a and the user device 102b may include communication units having one or more transceivers to enable the user device 102a and the user device 102b to communicate with each other and/or a server device 106. Accordingly, and as disclosed in further detail below, the user device 102a may be in communication with the user device 102b directly or indirectly. As used herein, the phrase "in communication," including variances thereof, encompasses direct communication and/or indirect communication through one or more intermediary components and does not require direct physical (e.g., wired and/or wireless) communication and/or constant communication, but rather additionally includes selective communication at periodic or aperiodic intervals, as well as one-time events.

For example, the user device 102a and/or the user device 102b in the personal conversationalist system 100 of FIG. 1 include first (e.g., long-range) transceiver(s) to permit the user device 102a and/or the user device 102b to communicate with a network 104 via a communication channel 107a and a communication channel 107b, respectively. The network 104 may be implemented by an example mobile cellular network, such as a long-term evolution (LTE) network or other third generation (3G), fourth generation (4G) wireless network, or fifth-generation (5G) wireless network. However, in some examples, the network 104 may be additionally or alternatively be implemented by one or more other communication networks, such as, but not limited to, a satellite communication network, a microwave radio network, an ad hoc network, a mesh network, and/or other communication network that would be apparent to one of skill in the art in possession of the present disclosure.

The user device 102a and/or the user device 102b additionally may include second (e.g., short-range) transceiver(s) to permit the user device 102a and/or the user device 102b to communicate with each other via a communication channel 105. In the illustrated example of FIG. 1, such second transceivers are implemented by a type of transceiver supporting short-range (i.e., operate at distances that are shorter than the long-range transceivers) wireless networking. For example, such second transceivers may be implemented by Wi-Fi transceivers (e.g., via a Wi-Fi Direct protocol), Bluetooth® transceivers, infrared (IR) transceiver, and other transceivers that are configured to allow the user device 102a and/or the user device 102b to intercommunicate via an ad-hoc or other wireless network. The second transceivers may provide peer-to-peer communications between the user devices 102a and 102b.

The personal conversationalist system 100 may also include or may be in connection with a server device 106. For example, the server device 106 may include one or more server devices, storage systems, cloud computing systems, and/or other computing devices (e.g., desktop computing device(s), laptop/notebook computing device(s), tablet computing device(s), mobile phone(s), etc.). As discussed below, the server device 106 may be coupled to a personal conversationalist (PC) database 110 that is configured to provide repositories such as a personal conversationalist repository of user profiles 110a that include various user configurations for the personal conversationalist system 100. For example, the user profiles 110a may include event criteria, instructions, persona preferences, interests about the user, past conversation sessions, and/or any other user information and instructions that would be apparent to one of skill in the art in possession of the present disclosure. Also, as discussed below, the server device 106 may be configured to provide a personal conversationalist controller that computationally processes data received from data inputs to identify and match physical environment conditions of the physical environment 103 to event criteria that may include one or more condition identifiers in the personal conversationalist database 110 such that the associated results, instructions, content and the like can be retrieved and provided to the user of the user device 102a and/or the user device 102b. While not illustrated in FIG. 1, each user device 102a and 102b may be coupled to one or more personal conversationalist databases, described below, that may include at least a portion of the user profiles 110a stored in the personal conversationalist database 110.

The personal conversationalist system 100 may also include or may be in connection with one or more environmental sensors such as an environmental sensor 112. The environmental sensor 112 may be provided in the physical environment 103. The environmental sensor 112a may include an imaging sensor (e.g., a two-dimensional image capturing camera, a three-dimensional image capturing camera, an infrared image capturing camera, a depth capturing camera, similar video recorders, and/or a variety of other image or data capturing devices), an acoustic sensor (e.g., a microphone, a microphone array, a directionally-discriminating acoustic sensor/transducer, and other acoustic sensors for detecting acoustic energy), a temperature sensor, a humidity sensor, a motion sensor, a pressure sensor, a gas sensor, an altitude sensor, a location sensor, and/or any other environmental sensor that detects information about the physical environment 103 that would be apparent to one of skill in the art in possession of the present disclosure. In some embodiments, the environmental sensor 112 may be included a "smart city device." For example, the environmental sensor 112 be included in a railroad crossing gate, a tollbooth, a parking lot gate, signage, traffic lights, a security camera or other interconnected devices within the physical environment 103 that are subscribed to a personal conversationalist service provided by the server device 106 that would be apparent to one of skill in the art in possession of the present disclosure. The environmental sensor 112 in the personal conversationalist system 100 of FIG. 1 may include or be coupled to a first (e.g., long-range) transceiver(s) to permit the environmental sensor 112 to communicate with a network 104 via a communication channel 113a. The environmental sensor 112 additionally may include second (e.g., short-range) transceiver(s) to permit the environmental sensor 112 to communicate with other environment sensors, the user device 102a via a communication channel 114a, and/or the user device 102b via a communication channel 114b. The second transceiver may be used for device-to-device communications within the physical environment 103. In the illustrated example of FIG. 1, such second transceivers are implemented by a type of transceiver supporting short-range (e.g., operate at distances that are shorter than the long-range transceivers) wireless networking. For example, such second transceivers may be implemented by a Wi-Fi transceiver (e.g., via a Wi-Fi Direct protocol), a Bluetooth® transceiver, an infrared (IR) transceiver, a Zigbee transceiver, and/or other transceivers that are configured to allow the user devices 102a and/or the environmental sensor 112 to intercommunicate via an ad-hoc or other wireless network. While a specific personal conversationalist system 100 has been illustrated and described, one of skill in the art in possession of the present disclosure will recognize that personal conversationalist systems may include a variety of different devices and/or components that enable the performance of conventional computing device functionality, as well as the functionality discussed below, while remaining within the scope of the present disclosure.

Figure 2A:
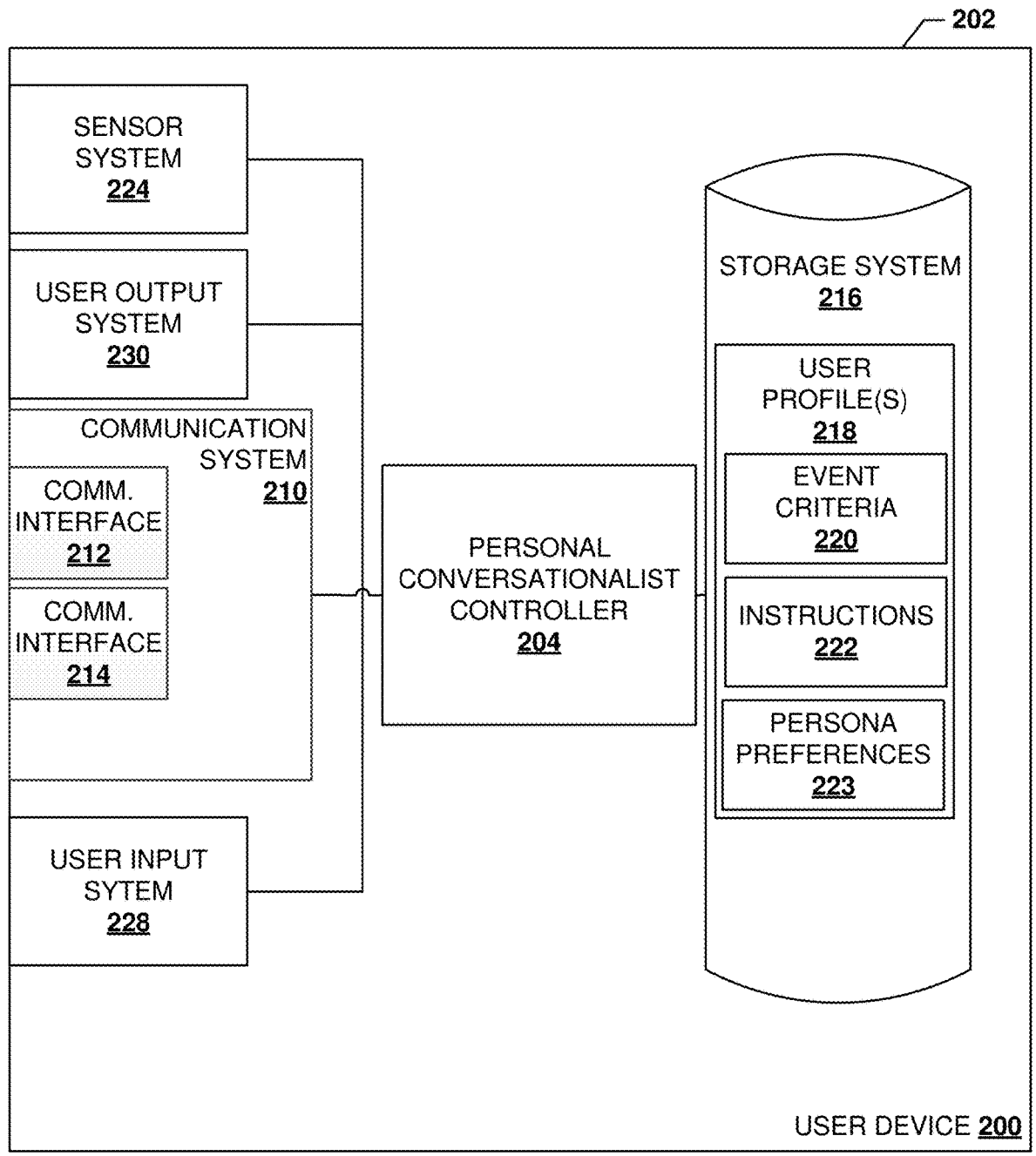
FIG. 2A is a schematic view illustrating an embodiment of a user device used in the personal conversationalist system of FIG. 1.
Figure 2B:
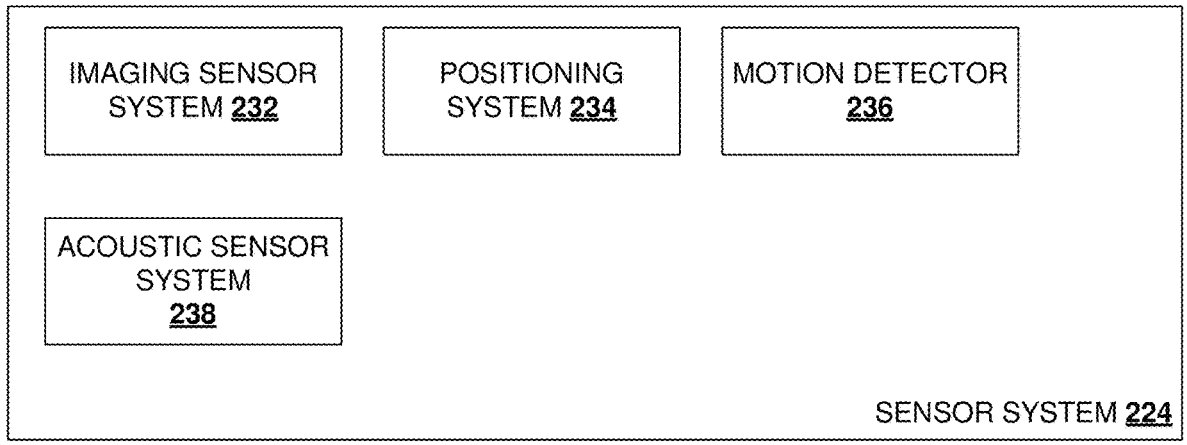
FIG. 2B is a schematic view illustrating an embodiment of a sensor system used in the user device of FIG. 2A.

Referring now to FIGS. 2A and 2B, an embodiment of a user device 200 is illustrated that may be the user device 102a or the user device 102b discussed above with reference to FIG. 1, and which may be provided by a mobile computing device such as a laptop/notebook computing device, a tablet computing device, a mobile phone, a vehicle, and a wearable computing device. In the illustrated embodiment, the user device 200 includes a chassis 202 that houses the components of the user device 200. Several of these components are illustrated in FIG. 2A. For example, the chassis 202 may house a processing system (not illustrated) and a non-transitory memory system (not illustrated) that includes instructions that, when executed by the processing system, cause the processing system to provide an a personal conversationalist controller 204 that is configured to perform the functions of the personal conversationalist controller and/or the user devices discussed below.

The chassis 202 may further house a communication system 210 that is coupled to the personal conversationalist controller 204 (e.g., via a coupling between the communication system 210 and the processing system). The communication system 210 may include software or instructions that are stored on a computer-readable medium and that allow the user device 200 to send and receive information through the communication networks discussed above. For example, the communication system 210 may include a communication interface 212 to provide for communications through the communication network 104 as detailed above (e.g., first (e.g., long-range) transceiver(s)). In an embodiment, the communication interface 212 may be a wireless antenna that is configured to provide communications with IEEE 802.11 protocols (Wi-Fi), cellular communications, satellite communications, other microwave radio communications and/or communications. The communication system 210 may also include a communication interface 214 that is configured to provide direct communication with other user devices, environmental sensors, storage devices, and/or other devices within the physical environment 103 discussed above with respect to FIG. 1 (e.g., second (e.g., short-range) transceiver(s)). For example, the communication interface 214 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 202 may house a storage device (not illustrated) that provides a storage system 216 that is coupled to the personal conversationalist controller 204 through the processing system. The storage system 216 may be configured to store one or more user profiles 218 in one or more personal conversationalist repositories. The user profiles 218 may include event criteria 220, instructions 222, persona preferences 223, a user identifier, and/or any other user associated instruction and/or information that would be apparent to one of skill in the art in possession of the present disclosure.

In various embodiments, the user device 200 may include a sensor system 224 that may be housed in the chassis 202 and/or provided on the chassis 202. The sensor system 224 may be coupled (e.g., coupled via a bus) to the personal conversationalist controller 204 via the processing system. The sensor system 224 may include one or more sensors that gather sensor data about the user device 200 and/or physical environment 103 that may be provided to the personal conversationalist controller 204 via the bus. The sensor data (e.g., environmental data) may be used by the personal conversationalist controller 204 to make decisions regarding signals to provide to output devices that provide outputs to the user of the user device 200.

Referring to FIG. 2B, the sensor system 224 is illustrated that may be the sensor system 224 of FIG. 2A. The sensor system 224 may include an imaging sensor system 232, a positioning system 234, a motion detector 236, an acoustic sensor system 238, and/or any other sensors that would be apparent to one of skill in the art in possession of the present disclosure used for operating the user device 200 and/or the personal conversationalist controller 204. In various embodiments, the imaging sensor system 232 may include one or more imaging sensors that are provided on various locations of the chassis 202. For example, the imaging sensors may include, a two-dimensional image capturing camera, a three-dimensional image capturing camera, an infrared image capturing camera, a depth capturing camera, similar video recorders, and/or a variety of other image capturing devices. The imaging sensors may also include photodetectors to that may be used to gather light from the physical environment 103. The imaging sensor system 232 may be used to gather visual information from the physical environment 103 surrounding the user device 200, for use in recognizing an object (e.g., object 108a and/or 108b) in the physical environment 103, and/or other functionality associated with the user device 200 that would be apparent to one of skill in the art in possession of the present disclosure. In various examples, the imaging sensor may be mechanically movable, for example, by mounting the camera on a rotating and/or tilting a platform.

The sensor system 224 may also include the positioning system 234 that is coupled to the personal conversationalist controller 204. The positioning system 234 may include sensors for determining the location and position of the user device 200 in the physical environment 103. For example, the positioning system 234 may include a global positioning system (GPS) receiver, a real-time kinematic (RTK) GPS receiver, a differential GPS receiver, a Wi-Fi based positioning system (WPS) receiver, an accelerometer, and/or other positioning systems and components.

The sensor system 224 may also include a motion detector 236. The motion detector 236 may include an accelerometer, a gyroscope, an altitude sensor and/or any other sensor for detecting and/or calculating the orientation and/or movement of the user device 200. The sensor system 224 may also include an acoustic sensor system 238 (e.g., a microphone, a microphone array, a directionally-discriminating acoustic sensor/transducer, and other acoustic sensors for detecting acoustic energy). The sensor system 224 may further include other sensors, such as, a visual spectrum light sensor, a sonar sensor, an infrared sensor, an ultraviolet sensor, a temperature sensor, a humidity sensor, a pressure sensor, a gas sensor, and/or any other sensor that would be apparent to one of skill in the art in possession of the present disclosure.

In various embodiments, the chassis 202 of the user device 200 in FIG. 2A also houses or the user device 200 is coupled to a user input system 228 that is coupled to the personal conversationalist controller 204 (e.g., via a coupling between the processing system and the user input system 228). In an embodiment, the user input system 228 may be provided by a keyboard input subsystem, a mouse input subsystem, a track pad input subsystem, a touch input display system, and/or any other user input system.

The chassis 202 also houses or the user device 200 is coupled to a user output system 230 that is coupled to the personal conversationalist controller 204 (e.g., via a coupling between the processing system and the user output system 230). In an embodiment, the user output system 230 may be provided by a display device that is integrated into the user device 200 and that includes a display screen (e.g., a display screen on a laptop/notebook computing device, a tablet computing device, a mobile phone, or wearable device), or by a display device that is coupled directly to the user device 200 (e.g., a display device coupled to a desktop computing device by a cabled or wireless connection). The display device may include any 2-dimensional or 3-dimensional display device, a projector device, a holographic projector device, and/or any other visual display device that would be apparent to one of skill in the art in possession of the present disclosure. In various embodiments the user output system 230 may include any audio output device such as an acoustic emitter that may include a speaker array or other sound emitting device that generates and emits acoustic energy to the physical environment 103 and/or a user of the user device 102. The user output system 230 may include one or more other output devices such as a haptic feedback device that is configured to provide sounds, vibrations, visualizations, and/or other tactile and/or haptic feedback devices that would be apparent to one of skill in the art in possession of the present disclosure. While a specific embodiment of a user device 200 is illustrated and described, one of skill in the art in possession of the present disclosure will recognize that other components may be included in the user device 200 to provide conventional user device functionality, as well as the functionality discussed below, while remaining within the scope of the present disclosure.

Figure 3:
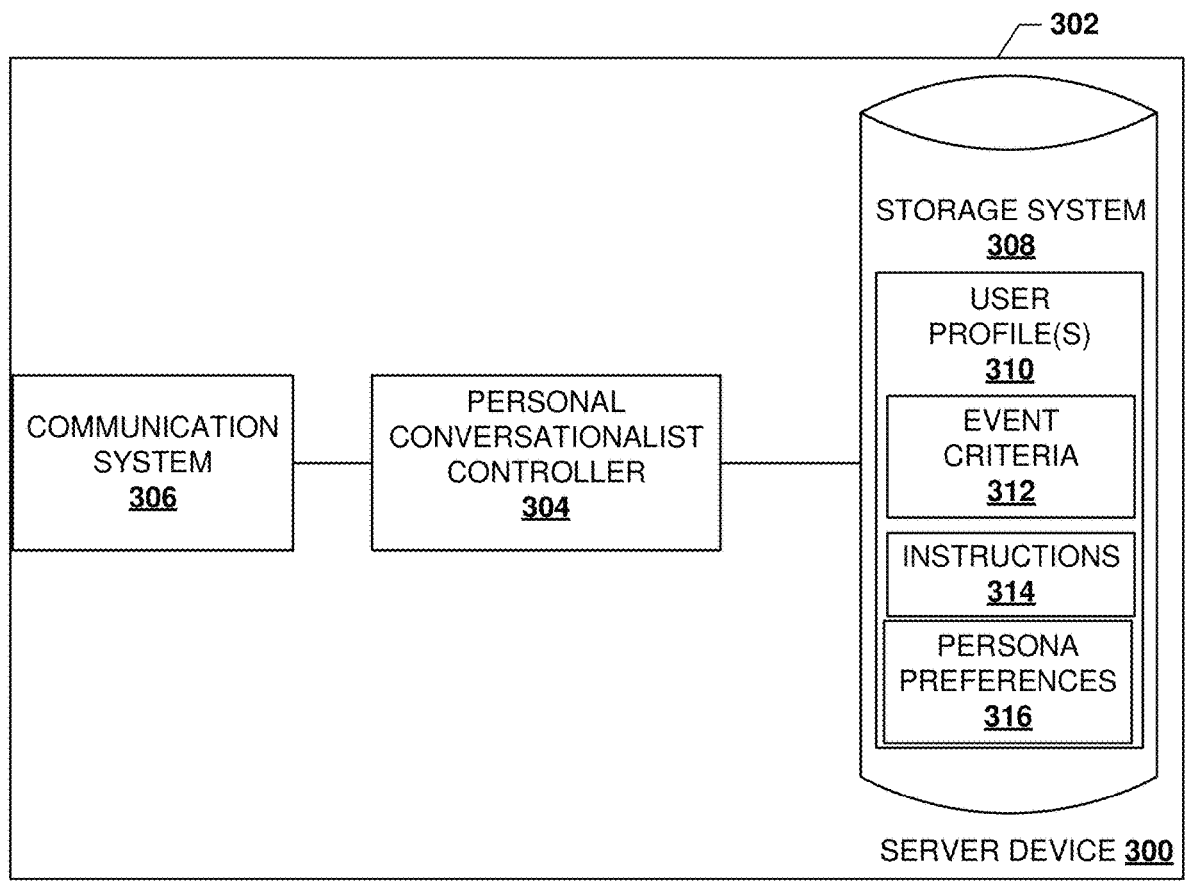
FIG. 3 is a schematic view illustrating an embodiment of a server device used in the personal conversationalist system of FIG. 1.

Referring now to FIG. 3, an embodiment of a server device 300 is illustrated that may be the server device 106 discussed above with reference to FIG. 1. In the illustrated embodiment, the server device 300 includes a chassis 302 that houses the components of the server device 300, only some of which are illustrated in FIG. 3. For example, the chassis 302 may house a processing system (not illustrated) and a non-transitory memory system (not illustrated) that includes instructions that, when executed by the processing system, cause the processing system to provide a personal conversationalist controller 304 that is configured to perform the functions of the personal conversationalist controller and/or server devices discussed below.

The chassis 302 may further house a communication system 306 that is coupled to the personal conversationalist controller 304 (e.g., via a coupling between the communication system 306 and the processing system) and that is configured to provide for communication through the network as detailed below. The communication system 306 may allow the server device 300 to send and receive information over the network 104 of FIG. 1. The chassis 302 may also house a storage device (not illustrated) that provides a storage system 308 that is coupled to the personal conversationalist controller 304 through the processing system. The storage system 308 may be configured to store user profiles 310 in one or more personal conversationalist repositories. The user profiles 310 may include event criteria 312, instructions 314, persona preferences 316, a user identifier, and/or any other user associated instruction and/or information that would be apparent to one of skill in the art in possession of the present disclosure. While a specific embodiment of a server device 300 is illustrated and described, one of skill in the art in possession of the present disclosure will recognize that other components may be included in the server device 300 to provide conventional user device functionality, as well as the functionality discussed below, while remaining within the scope of the present disclosure.

Figure 4:
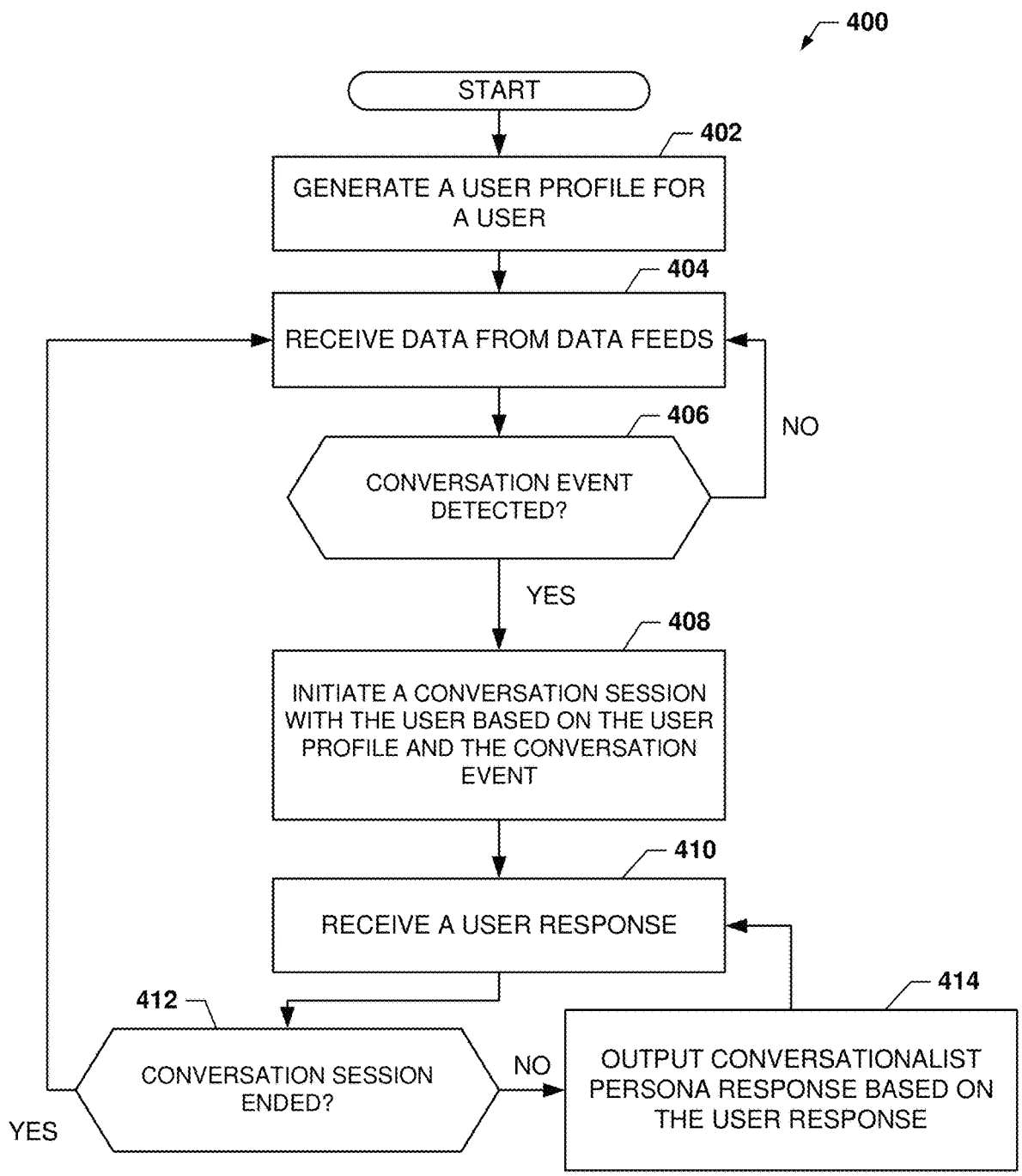
FIG. 4 is a flow chart illustrating an embodiment of a method of providing a personal conversationalist.
Figure 5:
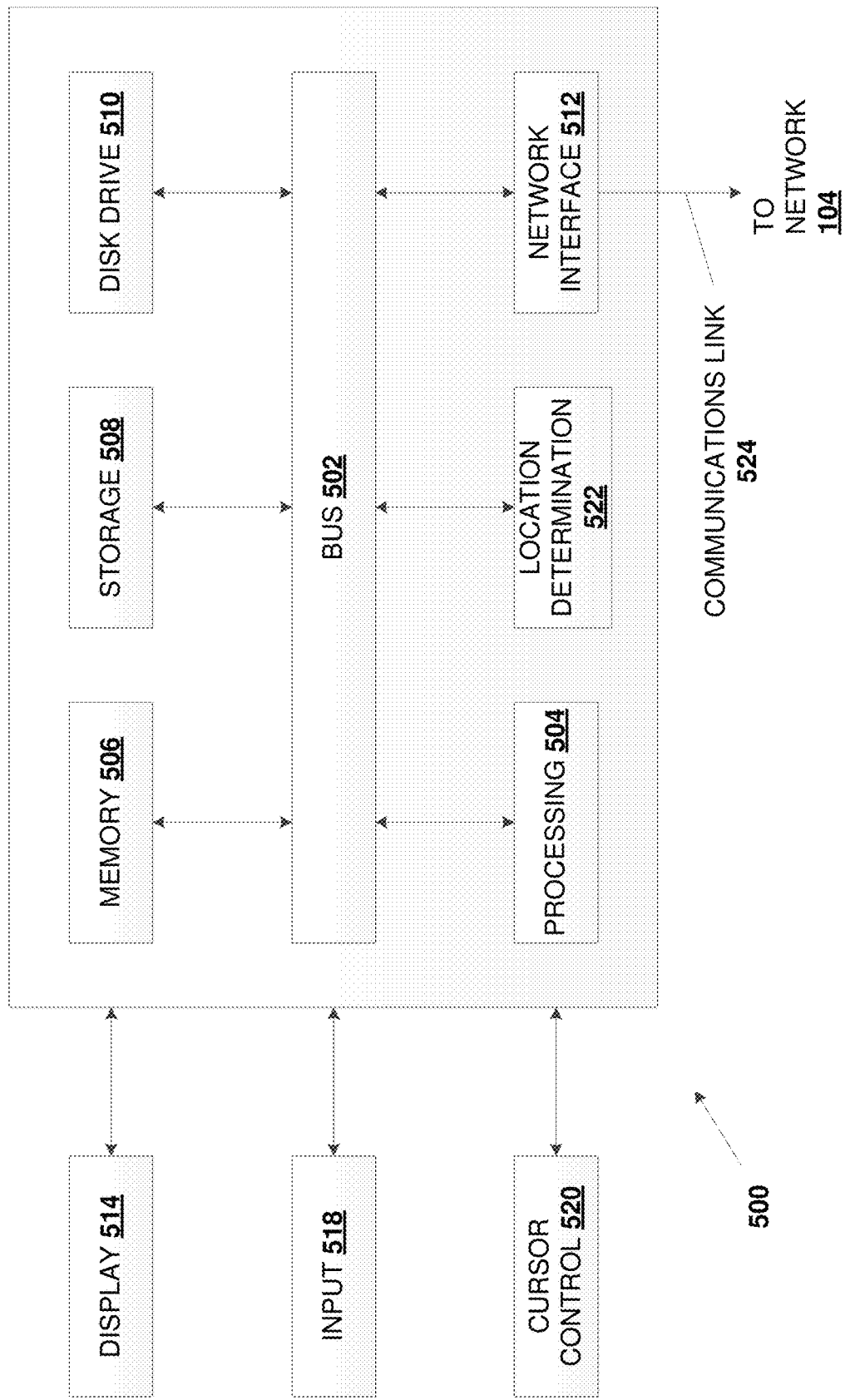
FIG. 5 is a schematic view illustrating an embodiment of a computer system.

Referring now to FIG. 4, an embodiment of a method 400 of providing a personal conversationalist is illustrated. The method 400 will be discussed in reference to the Figs. above. The method 400 begins at block 402 where a user profile is generated for a user of a personal conversationalist system. In an embodiment at block 402, a user of the user device 102a/200 may create a user profile 218 for the personal conversationalist controller 204 on the user device 102a/200. The personal conversationalist controller 204 may provide a personal conversationalist configuration interface (e.g., a wizard or other personal conversationalist user interface) via the user output system 230 that may request that the user of the user device 102a/200 set up preferences and other configurations for the user profile 218 that may be used to generate a conversationalist persona and initiate a conversation session. For example, the personal conversationalist configuration interface may establish persona preferences 223 such as, for example, a persona perspective, a persona bias, a persona "talking" behavior, a persona "gender", interests of the user and the personas, and/or any other conversationalist persona preferences or conversationalist persona configurations that would be apparent to one skill in the art in possession of the present disclosure. In another example, the persona conversationalist persona may establish other persona preferences 223 such as a persona analysis type, which may include: 1) analytical/logical analysis to the situation/object, 2) emotional analysis where feelings overcome logic, for example: it is too far and expensive to visit a place but since the user is feeling homesick, then the conversationalist persona may suggest for the user to visit that far place to satisfy emotional need, 3) the conversationalist persona could be financially or legally motivated so the conversationalist persona provides analysis based on legal perspective, financial sense and/or other financial/legal goals, and/or other persona analysis types that would be apparent to one of skill in the art in possession of the present disclosure.

In other examples, the personal conversationalist configuration interface may request information to establish event criteria 220 that indicates when the personal conversationalist controller 204 is to initiate a conversation session with a user. The personal conversationalist configuration interface may request information to generate the instructions 222 that may be associated with the event criteria 220.

However, in various embodiments, the event criteria 220, the instructions 222 and the persona preferences 223 may be provided in a default user profile that may be included in the user profile(s) 218. The default user profile or any user profile 218 may be changed later by the user or may adapt as the user uses the personal conversationalist system 100 via an artificial intelligence/machine learning algorithm included in the personal conversationalist controller 204. For example, as a default conversationalist persona interacts with the user, the personal conversationalist controller 204 may be configured with one or more machine learning algorithms to perform supervised machine learning, unsupervised machine learning (e.g., deep belief networks, neural networks, statistical pattern recognition, rule-based artificial intelligence, etc.) semi-supervised learning, reinforcement learning, deep learning, and/or other machine learning algorithms to generate the user profile 218 that includes the event criteria 220, the instructions 222, and the persona preferences 223.

In various embodiments, the user profile 218 generated at the user device 102a/200 may be provided to the personal conversationalist controller 304 of the server device 106/300. The server device 106/300 may store the user profile 218 as the user profile 110a/310 in the storage system 110/308. However, in other embodiments the user may generate the user profile 110a/310 via the personal conversationalist controller 304 on the server device 300. As such, the personal conversationalist controller 304 alone may perform the operations of the method 400, the personal conversationalist controller 204 alone may perform the operations of the method 400, or the personal conversationalist controller 304 and the personal conversationalist controller 204 may operate together via the network 104 to perform the operations of the method 400. As discussed below, the personal conversationalist controller 204 may perform a portion of processing while the personal conversationalist controller 304 performs another portion of the processing when instantiating and providing a conversationalist persona and a conversation session with a user. For example, the personal conversationalist controller 204 may perform processing tasks that are less resource intensive than the processing tasks performed by the personal conversationalist controller 304.

The method 400 then proceeds to block 404 where data feeds are received by the personal conversationalist controller. In an embodiment, at block 404, the personal conversationalist controller 204 of the user device 102a/200 may receive sensor data from the various sensors included in the sensor system 224. For example, the personal conversationalist controller 204 may receive video data and/or images from the imaging sensor system 232, location information from the positioning system 234, audio data from the acoustic sensor system 238, motion data about the user device 102a/200 and/or the physical environment 103 from the motion detector 236, and/or any other sensor data from sensors in the sensor system 224 that would be apparent to one of skill in the art in possession of the present disclosure. In various embodiments, the data feeds may include user inputs received by the personal conversationalist controller 204 via the user input system 228. For example, the user input system 228 may receive a mouse input, a touch input from a touch sensitive display screen, a keyboard input, and/or any other user inputs that would be apparent to one of skill in the art in possession of the present disclosure. One of skill in the art in possession of the present disclosure will recognize that the user inputs may be received via the sensor system 224. As such, at least a portion of the sensor system 224 may be included in the user input system 228. For example, a user may provide a voice command as a user input that is acoustic energy in the physical environment 103 and that acoustic energy is detected by an acoustic sensor such as a microphone included in the acoustic sensor system 238 that converts the acoustic energy to an audio signal that is then provided to the personal conversationalist controller 204 for processing.

In other embodiments, the personal conversationalist controller 204 of the user device 102a/200 may receive data feeds via the communication system 210. For example, the user device 102a may receive data feeds that includes information (e.g., user inputs, sensor data, etc.) gathered by the user device 102b via the communication channel 105 and/or via the network 104. In other examples, the user device 102a may receive data feeds that includes information gathered by the environmental sensor 112 via the communication channel 114a and/or via the network 104. In various embodiments, the user device 102b and/or the environmental sensor 112 may provide captured data as data feeds to the server device 106, which may forward those data feeds to the user device 102a. In other embodiments, the user device 102a may provide its data feeds to the environmental sensor 112, the user device 102b, and/or the server device 106. As such, each of the devices in the personal conversationalist system 100 may receive and/or provide data to each other if those devices are subscribed to the personal conversationalist service provided by the personal conversationalist system 100. In various embodiments, the user device 102a, the user device 102b, and/or the server device 106 may receive data feeds from third-party providers such as those provided by servers via the Internet and/or other third-party databases.

The method 400 then proceeds to decision block 406 where it is determined whether a conversation event is detected. In an embodiment, at decision block 406, the personal conversationalist controller 204 and/or the personal conversationalist controller 304 may be monitoring the one or more data feeds and processing those data feeds to determine whether the data within those data feed indicates that a conversation event has occurred, which initiates the conversation session with the user of the user device 102a/200. In an embodiment, the personal conversationalist controller 204 and/or 304 may monitor the data in the data feeds for data that satisfies one or more of event criterion included in the event criteria 220 and/or 312. The personal conversationalist controller 204 and/or 304 may include a conversation event monitor that monitors the data provided in the data feeds and compares the data in the data feeds to the event criteria 220 and/or 312 to determine whether the data satisfies one or more conditions defined by the event criteria 220 and/or 312. For example, the personal conversationalist controller 204 and/or 304 may monitor motion detector inputs provided by the motion detector 236. The motion detector 236 may be detecting motion in the physical environment 103 and/or the motion of the user device 102a/200 to determine whether the user intends to start a conversation session with a conversationalist persona. By basing the conversation event on motion, the personal conversationalist controller 204 and/or 304 can initiate a conversation session by avoiding specific user commands such as screen touch or voice input, which provides a seamless user experience. For example, the personal conversationalist controller 204 and/or 304 may be monitoring for predetermined thresholds of steadiness of the user device 102a/200 and/or a vertical orientation of the user device 102a/200. However, it is contemplated that other orientations and movements of the user device 102a/200 are contemplated to fall under the scope of this disclosure.

In another example, the personal conversationalist controller 204 and/or 304 may include a computer vision system or functionalities of a computer vision system to process and analyze images captured by one or more imaging sensors of the imaging sensor system 232 to identify objects such as items, actors, and/or features in the physical environment 103. The objects may include the objects 108a and/or 108b described above. The computer vision system may use an object recognition algorithm, video tracking, and other computer vision techniques. In some embodiments, the computer vision system can map the physical environment 103, track and identify objects 108a and/or 108b, and estimate the speed of the objects 108a and/or 108b. The personal conversationalist controller 204 and/or 304 may computationally process feature vectors from a captured image and determine whether the features vectors from the captured image have substantial correspondence with any object profiles that are associated with apparent source identifiers (e.g., identifiers associated with predetermined objects). In response to recognizing the object 108a and/or 108b, the personal conversationalist controller 204 and/or 304 may compare the recognize object 108a and/or 108b to event criteria 220 and/or 312 in the user profile 218/310 to determine whether recognition of a specific object indicates initiation of a conversation session. For example, if the user of the user device 102a is interested in pizza as identified in the user profile 218 and/or 310 and the user device 102b or environmental sensor 112 provides image data to the server device 106 that includes an image of the object 108b that may be a pizza truck that recently parked nearby, the personal conversationalist controller 304 may identify the pizza truck by recognizing words or phrases on the truck, images on the truck, images of the truck, images of pizza being distributed from the truck and/or any other image data that would be apparent to one of skill of the art in possession of the present disclosure that will indicate that a truck is a pizza truck. The personal conversationalist controller 304 may determine that the pizza truck may be of interest to the user of the user device 102a based on that user's profile 310 and send an indication to the user device 102a for the personal conversationalist controller 204 to initiate a conversation session with the user of the user device 102a about the pizza truck.

In yet another example, the personal conversationalist controller 204 and/or 304 may include an acoustic analysis monitor that may analyze acoustic signals from the acoustic sensor system 238 to determine whether acoustic signals satisfy one or more event criteria 220 and/or 312. The acoustic analysis monitor of the personal conversationalist controller 204 and/or 304 may computationally process the audio signal (e.g., feature vectors of the audio signal, the compressed and/or encoded audio signal, and/or other variations of the audio signal) by determining whether the audio signal substantially corresponds with an acoustic profile stored at an acoustic repository of the storage system 216 and/or 308. For example, an acoustic profile may include feature vectors that define characteristics of an audio signal such as an average zero-crossing rate, average spectrum prominent tones across a set of frequency bands, estimated tempo, spectral flatness, bandwidth, and/or other audio signal features suitable for identifying audio signals. Each acoustic profile may be associated with an apparent source identifier that identifies an apparent source that provides the acoustic energy, a mood associated with the acoustic energy (e.g., whether the user is sad, mad, happy, etc.), identifying the content included in the acoustic energy (e.g., words, sounds, and/or phrases spoken and/or produced), and/or any other information about the acoustic energy that would be apparent to one of skill in the art in possession of the present disclosure. The acoustic profile may also be configured such that any audio compression and/or encoding techniques (e.g., AAC, MP3, WMA, Vorbis, and other audio compression and/or encoding techniques) performed on the audio signal allow the acoustic analysis monitor to identify the audio signal based on the acoustic profiles. The audio signals have substantial correspondence with an acoustic profile when a predefined condition is satisfied. For example, the predefined condition may be that one or more feature vectors of the audio signal match or are within a threshold of similarity (e.g., 50% similar, 60% similar, 70% similar, 80% similar, 85% similar, 90% similar, 95% similar, 99% similar, 100% similar and other thresholds of similarity) between the audio signal and an acoustic profile. Substantial correspondence may also include situations where unsupervised machined learning techniques (e.g., using cluster analysis), and/or supervised machine learning techniques (e.g., using statistical classification) determines that audio signals in one group are more similar to each other than those in other groups.

In a specific example, the mood of the user of the user device 102a may be determined by the acoustic analysis monitor provided by the personal conversationalist controller 204 and/or 304. In response to detecting a particular mood, the personal conversationalist controller 204 and/or 304 may determine whether that mood satisfies an event criterion of the event criteria 220 and/or 312 to initialize a conversation session with the user based on mood. For example, if the user of the user device 102a is determined to be in an "unhappy" mood, the personal conversationalist controller 204 may initiate a conversation session that is directed to the mood of the user as discussed in more detail below.

In yet another example, the personal conversationalist controller 204 and/or 304 may determine location information provided by the positioning system 234 satisfies one or more event criterion of the event criteria 220 and/or 312. For example, the personal conversationalist controller 204 and/or 304 may provide a conversationalist persona to act as a travel companion and recognize, based on location, time, and/or other data from the data feeds that the user of the user device 102a is traveling and cause the conversationalist persona to function as a tour guide. The location of the user device 102a may cause the personal conversationalist controller 204 and/or 304 to initiate a conversation session based on the location as discussed in more detail below.

In yet another example, the personal conversationalist controller 204 and/or 304 may initiate a conversation session when a user launches a particular application on the user device 102a. For example, if the user launches a video streaming application, which satisfies an event criterion of the event criteria 220, the personal conversationalist controller 204 and/or 304 may initiate a conversation session. The personal conversationalist controller 204 and/or 304 and the application may be integrated via an application programming interface (API) such that the personal conversationalist controller 204 and/or 304 can detect the launch of the application via the API. While specific examples of data included in a data feed that cause the personal conversationalist controller 204 and/or 304 to initiate a conversation session are discussed, one of skill in the art in possession of the present disclosure will recognize that other data or combinations of data as well as one or more other event criterion of the event criteria 220 and/or 312 may be contemplated and fall under the scope of the present disclosure.

If a conversation event has not been detected at decision block 406, the method 400 may proceed to back to block 404 where the personal conversationalist controller 204 and/or 304 may continue to receive data from data feeds. However, if a conversation event has been detected at decision block 406, the method 400 may proceed to block 408 where a conversation session is initiated with the user based on the user profile and the conversation event that was detected. In an embodiment, at block 408, the personal conversationalist controller 204 and/or 304 may generate a conversationalist persona based on the one or more event criterion of the event criteria 220 and/or 312 that were satisfied, instructions 222 and/or 314 that may be associated with the event criteria 220 and/or 312, and persona preferences 223 and/or 316 that may be associated with the event criteria 220 and/or 312. In some examples, the conversationalist persona may include a "personality" that is derived from the one or more event criterion of the event criteria 220 and/or 312 that were satisfied, instructions 222 and/or 314 that may be associated with the event criteria 220 and/or 312, and persona preferences 223 and/or 316 that may be associated with the event criteria 220 and/or 312.

The personal conversationalist controller 204 and/or 304 may provide user outputs via the conversationalist persona and may provide an initial conversation session output to the user of the user device 102a. The user outputs may be determined based on the "personality" of the conversationalist persona. The initial conversation session output may be provided by the user output system 230 that is included in or coupled to the user device 102a/200. However, in other embodiments, the initial conversation session output may be provided on another device that is within visual and/or audio range of the user of the user device 102a. The initial conversation session output of the personal conversationalist controller 204 and/or 304 may be based on the one or more event criterion of the event criteria 220 and/or 312 that were satisfied, instructions 222 and/or 314 that may be associated with the event criteria 220 and/or 312, and persona preferences 223 and/or 316 that may be associated with the event criteria 220 and/or 312.

In various embodiments, the conversationalist persona may be output to the user as a holographic representation to be displayed by a holographic projector. In other embodiments, the conversationalist persona may provide the initial conversation session output as text via a display device included in the user output system 230, video on a display device included in the user output system 230, an audio output provided via a speaker system included in the user output system 230, and/or as any other output provided by a device included in the user output system 230.

The method 400 then proceeds to block 410 where a user response to the initial conversation session output is received. In an embodiment, at block 410, after the conversation session is initiated with the user of the user device 102a by providing the initial conversation session output, the personal conversationalist controller 204 and/or 304 may continue to receive and monitor data from the data feeds as discussed at block 404. The personal conversationalist controller 204 and/or 304 may detect a user response to the initial conversation session output in the data received from the data feeds. In an embodiment, the user response, may include a lack of a response. For example, if the personal conversationalist controller 204 and/or 304 does not detect in the data a user response after a timeout threshold is satisfied, the personal conversationalist controller 204 may determine that the user response is a non-response.

The method 400 then proceeds to decision block 412 where it is determined whether the user response indicates that the conversation session has ended. In an embodiment, at decision block 412, the personal conversationalist controller 204 and/or 304 may determine whether the user response detected indicates that the conversation session has ended. For example, the personal conversationalist controller 204 and/or 304 may use a natural language algorithm and optionally a voice recognition algorithm to determine that an audio signal received via a microphone in the user input system 228 and/or the sensor system 224 indicates that the user of the user device 102*a* no longer wants to participate in conversation session. For example, the user may say "End conversation," "Talk to you later," "Goodbye," and/or any other user response that would be apparent to one of skill in the art in possession of the present disclosure. In another example, the user response may be a non-response, as discussed above, and the personal conversationalist controller 204 and/or 304 may determine, using the event criteria 220, that the non-response indicates that the user no longer wants to participate in the conversation session. In another example, the user may provide some other non-verbal input such as shaking the user device 102*a* that is detected by the motion detector 236. If the user response indicates that the conversation session has ended, the method 400 may proceed to block 404 where the personal conversationalist controller 204 and/or 304 continues to receive data from the data feeds.

However, if the user response does not indicate that the conversation session has ended, the method 400 then proceeds to block 414 where a conversationalist persona response is outputted based on the user response. In an embodiment, at block 414, the personal conversationalist controller 204 and/or 304 may process the user response and determine, based on the user response and the event criteria 220, a conversationalist persona response. In various embodiments, the personal conversationalist controller 204 and/or 304 may continue to receive data from the data feeds that may be used to determine the conversationalist persona response. The conversationalist persona response may be a calculated response based on a confidence threshold. For example, if the personal conversationalist controller 204 and/or 304 determine that the conversationalist persona response generated based on the data that the personal conversationalist controller 204 and/or 304 has received satisfies a confidence threshold that may be predetermined, then the personal conversationalist controller 204 and/or 304 may output that conversationalist persona response via the user output system 230. However, if the confidence threshold is not satisfied, then the personal conversationalist controller 204 and/or 304 may generate a conversationalist persona response that inquires for more information from the user and output that conversationalist persona response.

In some embodiments, if the personal conversationalist controller 204 cannot determine a conversationalist persona response that satisfies the confidence threshold, the personal conversationalist controller 204 may query the personal conversationalist controller 304 to process the user response to determine whether the data and event criteria 312 available to the personal conversationalist controller 304 can cause the personal conversationalist controller 304 to determine a conversationalist persona response that satisfies the confidence threshold. If the personal conversationalist controller 304 determines the conversationalist persona response that satisfies the confidence threshold, then the personal conversationalist controller 304 may send the conversationalist persona response to the user device 102*a* via the network 104. The personal conversationalist controller 204 may then output the conversationalist persona response via the user output system 230. However, if the personal conversationalist controller 304 cannot determine a conversationalist persona response that satisfies the confidence threshold, then the personal conversationalist controller 304 may send a notification to the user device 102*a* via the network 104 that causes the personal conversationalist controller 204 to provide a conversationalist persona response via the user output system 230 that requests additional information.

Likewise, if the personal conversationalist controller 304 cannot determine a conversationalist persona response that satisfies a confidence threshold, the personal conversationalist controller 304 may query the user device 102*a* and/or the user device 102*b* to determine whether any of those user devices 102*a* and/or 102*b* or any other user device in the personal conversationalist system 100 that may be able to determine a conversationalist persona response that satisfies the confidence threshold.

In various embodiments, when processing a user response and/or the data received by the sensor system 224, a portion the processing may be performed at the user device 102*a* and another portion of the processing may be performed at the server device 106. In other embodiments, a portion of the processing may be performed at the user device 102*b*. In various embodiments, the personal conversationalist controller 204 may include a peer manager. The peer manager may utilize the communication interface 214, (e.g., WiFi Direct or Bluetooth Low Energy), as described above, for peer discovery and device-to-device communications. The peer manager may periodically scan for nearby user devices running the same personal conversationalist application. The peer manager may maintain a list of peer devices. Peer devices may be user devices that the peer manager can collaborate with such that the list of peer devices is dynamically changing as user devices come in and out of range of the communication interface 214.

The peer manager can also optimize sharing and fetching of processed data from peer user device via preference aware sharing policies. For example, a user of the user device 102*a* may select or otherwise declare preferences as to what objects within the physical environment 103 that the user is interested in. Thus, the user device 102*a* may receive processed results from the peer device (e.g., the user device 102*b*) that were processed by the server device 106 such that the user device 102*a* does not have to request that the server device 106 process the same data to obtain the same results that the server device 106 processed for a previous query by the user device 102*b*.

In various embodiments, once the conversationalist persona response is output to the user based on the user response, the method 400 may proceed back to block 410 where data from the data feeds is monitored for an additional user response and so on until the conversation session has ended. Upon each iteration of the conversationalist persona response and user response, the personal conversationalist controller 204 and/or 304 may use machine learning algorithms, discussed above, to adapt and "learn" new conversationalist persona responses based on successes and failures of previous conversationalist persona responses and conversation sessions. The personal conversationalist controller 204 and/or 304 may learn according to the specific user such as user response timing, common phrases used by the user, mood of the user, preferences of the user and/or other user information over time.

In various examples of the method 400, the personal conversationalist controller 204 and/or 304 may provide a conversationalist persona that acts as a companion. For example, upon manual configuration and/or learning experience from person's own history and other similar cases for similar users (age, profession, activity interests, marital status . . . etc.), the personal conversationalist controller 204 may engage in conversations based on the situational and emotional mood of the user or users. The conversationalist persona could function as a happy medium between two or more users by reiterating happy moments that happened between those users to defuse a confrontational mood between those users. For example, the personal conversationalist controller 204 and/or 304 may have access to photos, calendars, social media, past conversations between the users, and can extract "happy" memories for the users and reiterate them.

In another example, the personal conversationalist controller 204 and/or 304 may provide a conversationalist persona that acts as a travel companion. For example, as discussed above, the personal conversationalist controller 204 may initiate a conversation session based on the location of the user, a date, and/or other data, and may determine that the user is likely on vacation from the data. The conversationalist persona acting as the travel companion may describe the physical environment 103 to the user. In some examples, the description of the physical environment 103 may be from a personal angle. For example, if the user is at a museum and the user profile 218 and/or 310 indicates that the user prefers architecture over paintings, the personal conversationalist controller 204 and/or 304 may describe the architecture of the museum over the artwork that is in the museum. However, the user may provide a user response or an indication during the conversation session via the sensor system 224 and/or user input system 228 that the user prefers to discuss a particular exhibit or have a conversation about the exhibits instead of the museum itself.

In other examples, the personal conversationalist controller 204 and/or 304 may provide information that the personal conversationalist controller 204 and/or 304 receives from other user devices within the physical environment 103. For example, the user device 102b may detect, via data from its image capturing device, a painting created by a favorite artist of the user of the user device 102a. This data from the user device 102b along with location information about the user device 102b may be provided as a data feed to the server device 106 and the user device 102a from which the personal conversationalist controller 204 and/or 304 may determine to initiate a conversation session of the user of the user device 102a as to the location of the painting and information about the painting so that the user can locate the painting in the museum.

In another example, the personal conversationalist controller 204 and/or 304 may provide a conversationalist persona that acts as a commentator companion. For example, a data feed from a movie being displayed on the user device 102a or displayed on a display device that the user device 102a is capturing with its own imaging capture system may be processed by the personal conversationalist controller 204 and/or 304. The personal conversationalist controller 204 may analyze the movie for acting quality as per the user's request. The conversationalist controller 204 and/or 304 may compare the acting levels of the actors to their other roles in other movies and to other actors in the same role (e.g., farmer) in similar plots/situations and may compare them to real-videos of "farmers" and will provide point of view in terms of emotions, way of talking, dressing, hand movements, facial expressions, and any other features that would be apparent to one of skill in the art in possession of the present disclosure. The conversationalist persona that acts as a commentator companion may initiate a conversation session with the user and may converse with the user about the movie and actors. Based on the user response (e.g., the user may say "I like the way the actor appeared to be happy during the harvest season"), the conversationalist controller 204 and/or 304 may analyze the farmer's movement in the movie to determine a correspondence between the actor famer's movements and the movements of actual farmers to determine whether those movements are genuine or not. The personal conversationalist controller 204 and/or 304 and may search the Internet, data feeds of farmers harvesting, and/or other databases for the emotional state of farmers during a harvest season to formulate a conversationalist persona response to the user's response In another example, the personal conversationalist controller 204 and/or 304 may provide a conversationalist persona that acts as an announcer companion for an event in the physical environment 103. For example, the event may be a concert, a sporting event at a sports venue, a child's sporting event or game at a park, a festival, a parade, a fair, a race, an amusement park and/or any other event that would be apparent one of skill in the art in possession of the present disclosure. With reference to a sporting event example, the personal conversationalist controller 204 and/or 304 may use one or more live video feeds from cameras of the user device 102a, the environmental sensor 112, and/or the user device 102b to determine each player's name and query the rules of the sport being played from the Internet or from some other data source. In some examples, the personal conversationalist controller 204 and/or 304 may allow the user to modify the rules (e.g., smaller field for children participating in the sport). The data from the data feeds (e.g., video and audio), and game rules, and data about sports commentators available in a database, will be merged in the personal conversationalist controller 204 and/or 304 and the output will be an emotionally interactive announcer companion for the user of the user device 102a. For example, if a user that is talking about the game, a personal conversationalist controller 204 and/or 304 may select a camera angle to present to the user and sometimes the user selects the camera angle. In some examples, the conversationalist persona that acts as an announcer companion only talks when a team scores. If the camera of the user device 102a is focused on a coach or a particular player, the announcer companion may talk about that coach or player.

In various examples, the personal conversationalist controller 204 and/or 304 may select a video feed that is gathered from the environmental sensor 112 and/or the user device 102b to be presented on the user device 102a. For example, the user of the user device 102a may be located at one end of the field while the user device 102b may be located at the other end of the field. If the personal conversationalist controller 204 and/or 304 determines that the user device 102b is providing a better video feed than that of the user device 102a based on, for example, distance between the object 108b (e.g., a player, a puck, a ball, a horse, and the like) and the user devices 102a and 102b or some other condition is satisfied that would be apparent to one of skill in the art in possession of the present disclosure, then the personal conversationalist controller 204 and/or 304 may provide the video feed from the user device 102b to the user device 102a via the user output system 230 and provide announcements based on that video feed. The video output to the user output system 230 of the user device 102a may revert to the video input obtained by the imaging sensor system 232 of the user output system 230 when a second condition is satisfied such as when the object 108b is more visible or closer to the user device 102a than user device 102b.

In another example, the personal conversationalist controller 204 and/or 304 may provide a conversationalist persona that acts as a health and protection companion for a user. For example, the personal conversationalist controller 204 and/or 304 monitor for behavior of the user which could put the user at risk of harm. In some examples, this could take the form of monitoring for suicidal thoughts or actions, monitoring for dangerous behavior (e.g., walking across a busy street, consuming many drugs or alcohol, travelling through a dangerous neighborhood, or speaking or acting in a threatening way to others), and other user behaviors that would be apparent to one of skill in the art in possession of the present disclosure. The personal conversationalist controller 204 and/or 304 could be determine by the actions, words, tone, facial expressions of the user or others that are provided by the one or more data feeds. The conversationalist persona that acts as the health and protection companion may measure dementia in an individual on a daily or weekly basis. Other types of health issues could be identified and referred to the appropriate sources for treatment or the personal conversationalist controller 204 and/or 304 could let the user know of these problems or dangers. The personal conversationalist controller 204 and/or 304 may try to get a depressed user to do more outside the house, call for counselling, reach out to friends, eat better, sleep more, and/or any other activity that may improve the user's mood. This guidance might be explicit communicated to the user or provided discreetly through hints and suggestions. The conversationalist persona that acts as the health and protection companion might communicate and coordinate with other personas regarding preferences, medical issues, and other aspects of the individual user, so a coordinated interaction might be presented. For example, the user may say: "I am upset about the passing of a friend," my conversationalist persona that acts as the health and protection companion and other conversationalist personas the user may encounter may project a positive mood to me and not discuss or raise depressing topics. While a few examples of different conversationalist personas are provided one of skill in the art in possession of the present disclosure will recognize that other conversationalist personas may be contemplated. For example, a conversationalist controller may help a user with weight loss, financial management (i.e., less spending and more savings), bad habits, and learning (e.g., language), survey and testing capabilities, and/or other user related activities.

Thus, systems and methods have been provided for a personal conversationalist. A user device may collaborate with other user devices within a physical environment and/or over a network to receive and/or provide information between each other such that a personal conversationalist controller can determine when to initiate a conversation session with a user that includes outputting one or more conversationalist persona responses and receiving one or more user responses. The conversationalist persona used to perform the personal conversation session may dynamically change based on the conversation session and the user. Processing tasks may be distributed to various devices within the personal conversationalist system and/or repeat processing tasks may be shared between devices within the physical environment to limit the repetitive processing. This improves efficiency by reusing computation resources in the cloud, reduces end-to-end latency, and saves mobile data usage.

Referring now to FIG. 6, an embodiment of a computer system 500 suitable for implementing, for example, the user devices 102a, 102b, and 200, and the server devices 106 and 300 is illustrated. It should be appreciated that other devices utilized in the personal conversationalist system 100 discussed above may be implemented as the computer system 500 in a manner as follows.

In accordance with various embodiments of the present disclosure, computer system 500, such as a computer and/or a network server, includes a bus 502 or other communication mechanism for communicating information, which interconnects subsystems and components, such as a processing component 504 (e.g., processor, micro-controller, digital signal processor (DSP), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 518 (e.g., keyboard, keypad, or virtual keyboard), a cursor control component 520 (e.g., mouse, pointer, or trackball), and/or a location determination component 522 (e.g., a Global Positioning System (GPS) device as illustrated, a cell tower triangulation device, and/or a variety of other location determination devices.) In one implementation, the disk drive component 510 may comprise a database having one or more disk drive components.

In accordance with embodiments of the present disclosure, the computer system 500 performs specific operations by the processing component 504 executing one or more sequences of instructions contained in the system memory component 506, such as described herein with respect to the user device(s) 102a, 102b and 200, the environmental sensor 112, the server device 106 and 300. Such instructions may be read into the system memory component 506 from another computer-readable medium, such as the static storage component 508 or the disk drive component 510. In other embodiments, hardwired circuitry may be used in place of or in combination with software instructions to implement the present disclosure.

Logic may be encoded in a computer-readable medium, which may refer to any medium that participates in providing instructions to the processing component 504 for execution. Such a medium may take many forms, including but not limited to, non-volatile media, volatile media, and tangible media employed incident to a transmission. In various embodiments, the computer-readable medium is non-transitory. In various implementations, non-volatile media includes optical or magnetic disks and flash memory, such as the disk drive component 510, volatile media includes dynamic memory, such as the system memory component 506, and tangible media employed incident to a transmission includes coaxial cables, copper wire, and fiber optics, including wires that comprise the bus 502 together with buffer and driver circuits incident thereto.

Some common forms of computer-readable media include, for example, floppy disk, flexible disk, hard disk, magnetic tape, any other magnetic medium, CD-ROM, DVD-ROM, any other optical medium, any other physical medium with patterns of holes, RAM, PROM, EPROM, FLASH-EPROM, any other memory chip or cartridge, cloud storage, or any other medium from which a computer is adapted to read. In various embodiments, the computer-readable media are non-transitory.

In various embodiments of the present disclosure, execution of instruction sequences to practice the present disclosure may be performed by the computer system 500. In various other embodiments of the present disclosure, a plurality of the computer systems 500 coupled by a communication link 524 to a network 104 (e.g., such as a LAN, WLAN, PTSN, and/or various other wired or wireless networks, including telecommunications, mobile, and cellular phone networks) may perform instruction sequences to practice the present disclosure in coordination with one another.

The computer system 500 may transmit and receive messages, data, information and instructions, including one or more programs (e.g., application code) through the communication link 524 and the network interface component 512. The network interface component 512 may include an antenna, either separate or integrated, to enable transmission and reception via the communication link 524. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components, and vice versa.

Software, in accordance with the present disclosure, such as program code or data, may be stored on one or more computer-readable media. It is also contemplated that software identified herein may be implemented using one or more general-purpose or special-purpose computers and/or computer systems, networked and/or otherwise. Where applicable, the ordering of various steps described herein may be changed, combined into composite steps, and/or separated into sub-steps to provide features described herein.

The foregoing is not intended to limit the present disclosure to the precise forms or particular fields of use disclosed. As such, it is contemplated that various alternate embodiments and/or modifications to the present disclosure, whether explicitly described or implied herein, are possible. Persons of ordinary skill in the art in possession of the present disclosure will recognize that changes may be made in form and detail without departing from the scope of what is claimed.

What is claimed is:

1. A method, comprising:
receiving, by a processing system comprising a processor, a first data input feed including motion data;
accessing, by the processing system, a first user profile that is as associated with a first user;
detecting, by the processing system, a conversation event when the motion data matches one or more attributes of the first user profile and the first data input feed satisfies a first conversation event condition accordingly;
generating, by the processing system, a first conversationalist persona from a plurality of conversationalist personas, wherein the first conversationalist persona has a personality that is derived responsive to the conversation event detected, the first user profile accessed, and the first data input feed; and
initiating, by the processing system, a first conversation session via the first conversationalist persona generated by outputting a first conversationalist persona response that is based on the conversation event, the first user profile, and the first data input feed, wherein the initiating further comprises initiating the first conversation session by avoiding a voice input from the first user, thereby providing a seamless user experience.

2. The method of claim 1, further comprising:
receiving, by the processing system, a second data feed, wherein the generating the first conversationalist persona is based on the first conversation event condition, the first user profile, the first data input feed, and the second data feed.

3. The method of claim 1, further comprising:
receiving, by the processing system, a first user response in response to the first conversationalist persona response;
determining, by the processing system, a second first conversationalist persona response based on the first user response, the first data input feed, and the first user profile; and
outputting a second conversationalist persona response based on the first user response.

4. The method of claim 1, further comprising:
receiving, by the processing system, a first user response in response to the first conversationalist persona response; and
updating, using a machine learning algorithm, the first user profile based on the first user response to generate a first user updated profile.

5. The method of claim 4, further comprising:
generating, by the processing system, a second conversationalist persona from the plurality of conversationalist personas based on the conversation event, the first user updated profile, and the first data input feed; and
initiating, by the processing system, a second conversation session via the second conversationalist persona by outputting a second conversationalist persona response that is based on the conversation event, the first user updated profile, and the first data input feed.

6. The method of claim 1, wherein the generating the first conversationalist persona is performed by a first user device associated with the first user.

7. The method of claim 1, wherein the generating the first conversationalist persona is performed by a server device that is in communication with a first user device associated with the first user.

8. The method of claim 1, further comprising:
receiving, by the processing system, a first user response in response to the first conversationalist persona response;
determining, by the processing system, that the first user response indicates that the first conversation session has ended; and
ending, by the processing system, the first conversation session.

9. The method of claim 8, wherein the first user response is a lack of user input during a predetermined time.

10. The method of claim 1, wherein the detecting the conversation event includes detecting, by the processing system, that a location of the first user identified by location data included in the first data input feed satisfies a location condition.

11. The method of claim 1, wherein the detecting the conversation event includes detecting, by the processing system, a mood of the first user based on acoustic data included in the first data input feed.

12. The method of claim 1, further comprising:
providing, by the processing system, a first output of the first data input feed to the first user via a user output system;
receiving, by the processing system, a second data input feed;
determining, by the processing system, that the second data input feed satisfies an output condition; and
providing, by the processing system, a second output of the second data input feed to the first user via the user output system.

13. The method of claim 12, further comprising: outputting, by the processing system a second conversationalist persona response based on data provided in the second data input feed.

14. The method of claim 12, wherein the first data input feed is obtained from a first sensor system coupled to a first user device and the user output system is coupled to the first user device, and wherein the second data input feed is obtained from a second sensor system that is coupled to a second user device and is received by the first user device via a communication system.

15. The method of claim 1, further comprising: receiving, by the processing system, a second data input feed, wherein the first conversationalist persona response is based on the conversation event, the first user profile, and the first data input feed.

16. The method of claim 1, further comprising:
determining that processing performed for the generating the first conversationalist persona or generating the first conversationalist persona response satisfies a processing threshold at a first user device;
performing a first portion of the processing at the first user device; and
off-loading a second portion of the processing to a server device.

17. The method of claim 1, further comprising:
accessing, by the processing system a second user profile that is as associated with a second user;
detecting, by the processing system, the conversation event when one of the motion data, image data, acoustic data, and location data matches another attribute of the second user profile and the first data input feed satisfies the first conversation event condition accordingly;
generating, by the processing system, a second conversationalist persona based on the conversation event, the second user profile, and the first data input feed; and
initiating a second conversation session via the second conversationalist persona by outputting a second conversationalist persona response is based on the conversation event, the second user profile, and the first data input feed.

18. The method of claim 17, wherein the second conversationalist persona and the second conversationalist persona response provide different content than the first conversationalist persona and the first conversationalist persona response.

19. A personal conversationalist system, comprising:
a processor; and
a computer-readable medium storing instructions which, when executed by the processor, cause the processor to perform operations comprising:
receiving a first data input feed including motion data;
accessing a first user profile that is as associated with a first user;
detecting a conversation event when the motion data matches one or more attributes in the first user profile and the first data input feed satisfies a first conversation event condition accordingly;
generating a first conversationalist persona from a plurality of conversationalist personas, wherein the first conversationalist persona has a personality that is derived responsive to the conversation event detected, the first user profile accessed, and the first data input feed; and
initiating a first conversation session via the first conversationalist persona generated by outputting a first conversationalist persona response that is based on the conversation event, the first user profile, and the first data input feed, wherein the initiating further comprises initiating the first conversation session by avoiding a voice input from the first user, thereby providing a seamless user experience.

20. A non-transitory, machine-readable medium having stored thereon machine-readable instructions executable to cause a machine to perform operations comprising:
receiving a first data input feed including motion data;
accessing a first user profile that is as associated with a first user;
detecting a conversation event when the motion data in the first data input feed satisfies a first conversation event condition;
generating a first conversationalist persona from a plurality of conversationalist personas, wherein the first conversationalist persona has a personality that is derived responsive to detecting the conversation event, wherein the first conversationalist persona is based on the first user profile, and the first data input feed; and
initiating a first conversation session via the first conversationalist persona generated by outputting a first conversationalist persona response that is based on the conversation event, the first user profile, and the first data input feed, wherein the initiating further comprises initiating the first conversation session by avoiding a voice input from the first user, thereby providing a seamless user experience.

* * * * *